United States Patent [19]
Saito et al.

[11] Patent Number: 5,191,497
[45] Date of Patent: Mar. 2, 1993

[54] MAGNETIC DISK PACK AND MAGNETIC DISK RECORDING/REPRODUCING APPARATUS WITH IMPROVED HEAD TOUCH

[75] Inventors: Hitoshi Saito, Tokyo; Yasuo Nagashima, Odawara; Toshihiko Matsuo; Takashi Matsumoto, both of Tokyo, all of Japan

[73] Assignee: Fuji Photo Film Co., Ltd., Kanagawa, Japan

[21] Appl. No.: 935,355

[22] Filed: Aug. 28, 1992

Related U.S. Application Data

[63] Continuation of Ser. No. 371,857, Jun. 27, 1989, abandoned.

[30] Foreign Application Priority Data

| Jul. 1, 1988 | [JP] | Japan | 63-162667 |
| Jul. 8, 1988 | [JP] | Japan | 63-169037 |
| Dec. 22, 1988 | [JP] | Japan | 63-322014 |

[51] Int. Cl.$^5$ .............................................. G11B 23/03
[52] U.S. Cl. .................................. 360/133; 360/130.34
[58] Field of Search .................... 360/133, 128, 130.34

[56] References Cited

U.S. PATENT DOCUMENTS

| 4,577,251 | 3/1986 | Okada | 360/128 X |
| 4,652,960 | 3/1987 | MacDonald, II | 360/130.34 |
| 4,814,922 | 3/1989 | Osanai | 360/130.34 X |
| 4,814,926 | 3/1989 | Gulbrandsen | 360/133 |
| 4,907,112 | 3/1990 | Watanabe et al. | 360/130.34 X |
| 4,945,436 | 7/1990 | Nagashima | 360/340.34 X |

FOREIGN PATENT DOCUMENTS

| 0003748 | 1/1984 | Japan | 360/130.34 |
| 0009868 | 1/1986 | Japan | |
| 0001168 | 1/1987 | Japan | |

Primary Examiner—Andrew L. Sniezek
Attorney, Agent, or Firm—Sughrue, Mion, Zinn, Macpeak & Seas

[57] ABSTRACT

In a magnetic disk pack comprising a protective casing rotatably accommodating a flexible magnetic disk thereinside and having a pair of aligned windows formed at corresponding positions respectively so that a magnetic head can be inserted into one of the windows to be brought into sliding contact with the magnetic disk under rotation thereby recording and reproducing picture information on and from the magnetic disk, an inclined surface making an angle with the free rotation plane of the magnetic disk is provided on an inner part of the marginal edge of at least one of the windows or on a member resiliently supported at that position thereby inducing a positive pressure or a negative pressure between the rotating magnetic disk and the inclined surface depending on the direction of rotation of the magnetic disk. Such a positive pressure or negative pressure is utilized to urge or attract the magnetic disk toward and onto the magnetic head so as to ensure satisfactory head touch. In a mangetic disk recording-/reproducing apparatus in which magnetic heads are inserted into such a magnetic disk pack, and a magnetic disk is rotated in one direction and the other by a reversible spindle motor, an inclined surface making an angle with the free rotation plane of the magnetic disk is provided on each of control members inserted into the windows of the magnetic disk pack together with the magnetic heads so as to similarly ensure satisfactory head touch.

8 Claims, 12 Drawing Sheets

FIG. I
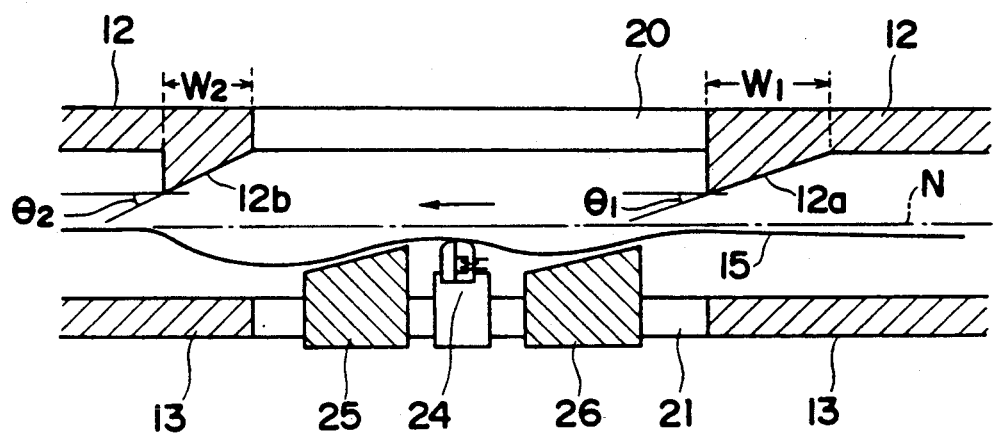
FIG. 3
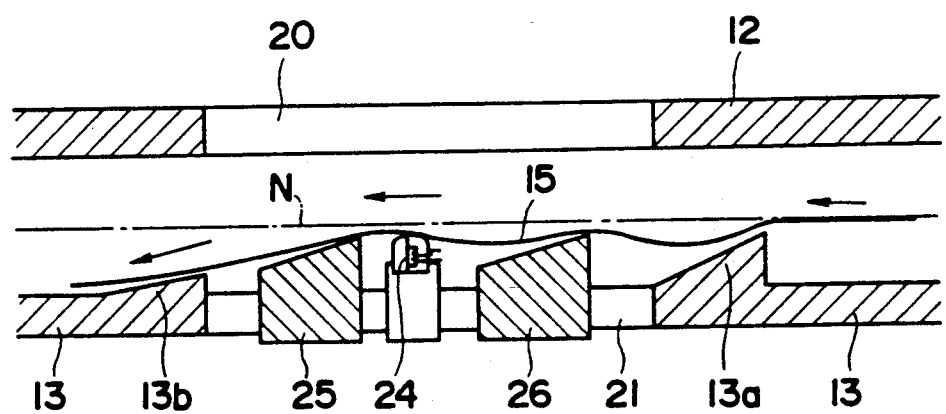

MAGNETIC DISK PACK AND MAGNETIC DISK RECORDING/REPRODUCING APPARATUS WITH IMPROVED HEAD TOUCH

This is a continuation of application Ser. No. 07/371,857 filed Jun. 27, 1989 now abandoned.

BACKGROUND OF THE INVENTION

1. Field of the Invention

This invention relates to a magnetic disk pack containing a magnetic disk having a recording medium coated on one or both of its surfaces so that picture information can be magnetically recorded with a high recording density and the recorded picture information can then be reproduced for observation by the viewer, and relates also to a magnetic disk recording/reproducing apparatus suitable for recording and reproduction of picture information on and from such a magnetic disk.

2. Description of the Related Art

An electronic still camera system has been developed and is now in practical use. This electronic still camera system comprises the combination of an imaging device such as a solid-state imaging unit or a camera tube and a recording device using a recording unit in the form of a rotatable magnetic disk which is inexpensive and has a relatively large memory capacity. A still picture of a subject is taken by the imaging device, and the still picture information is recorded on the magnetic disk in the recording device to be then reproduced or printed by means such as a television system or a printer. The magnetic disk used in the electronic still camera system is formed by coating a magnetic material on one or both surfaces of a thin disk-shaped base of a synthetic resin. Therefore, the magnetic disk is flexible but susceptible to a mechanical force tending to cause deformation. Also, because attachment of dust or like foreign matter on the surface of the magnetic disk adversely affects the accuracy of picture information recording and reproduction, the magnetic disk is commonly sold in the form of a magnetic disk pack in which the magnetic disk is housed in a deformation-resistive protective casing.

FIG. 12 is a partly cut-away perspective view of the front surface side of such a magnetic disk pack, and FIG. 13 is a sectional view taken along the line XIII—XIII in FIG. 12. As shown in FIGS. 12 and 13, the magnetic disk pack generally designated by the reference numeral 11 is principally formed of a protective casing 14 consisting of an upper case 12 and a lower case 13 made of a synthetic resin, a flexible magnetic disk 15 rotatably housed within the protective casing 14, and a shutter 16 slidably mounted along one of the marginal end edges of the upper surface of the protective casing 14. This shutter 16 is made of a metal such stainless steel and has a generally U-like sectional shape. A center core 17 acting as a reinforcing member is provided at the center of the magnetic disk 15. A shaft-receiving hole 18 is bored in the center core 17 so that a drive shaft of a recording/reproducing apparatus can be inserted into this hole. The upper and lower surfaces of the center core 17 are exposed to the outside from aligned central openings 19 of the upper and lower cases 12 and 13 respectively. The upper case 12 is formed with a window 20 into which a regulation member 22 of the recording/reproducing apparatus is inserted, and the lower case 13 is formed, at a position corresponding to the window 20, with a window 21 into which a magnetic head 23 is inserted, as shown in FIG. 13. These windows 20 and 21 are opened and closed by the sliding movement of the shutter 16.

The size, dimensional accuracy, etc. of the magnetic disk pack having such a structure are now standardized, and the magnetic disk pack enjoys compatibility in any of the magnetic disk recording/reproducing apparatuses made by various makers.

However, the magnetic disk recording/reproducing apparatus themselves are not standardized yet and have a variety of structures and designs different depending on the maker. Thus, the shape and size of the regulation member 22 can be freely designed.

JP-A-61-9868 (1986) proposes a magnetic disk pack in which, in lieu of the regulation member 22, a negative pressure is utilized to attain desired head touch. (Herein, the term "head touch" is used to indicate attainment of satisfactory recording or reproducing contact between a magnetic head and a magnetic disk.) That is, JP-A-61-9868 discloses an arrangement as shown in FIG. 14A. Referring to FIG. 14A, two tapered control members 26 and 25 are disposed on the upstream and downstream sides respectively of a magnetic head 24 so that a negative pressure can be induced between a rotating magnetic disk 27 and the control members 25,26. (Herein, the terms "upstream" and "downstream" are used to indicate the positions of the control members 25 and 26 relative to the direction of rotation of the magnetic disk 27 shown by the arrow.) When the negative pressure is induced, the magnetic disk 27 is attracted toward the control members 25 and 26 so that the magnetic head 24 can achieve stable recording or reproducing contact with the magnetic disk 27.

Thus, in the prior art apparatus, the desired head touch between the magnetic head 23 or 24 and the magnetic disk 15 or 27 is ensured by means such as the regulation member 22 or control members 25 and 26. Therefore, ensurance of good head touch is determined by the selection or design of the means described above, and this fact adversely affects the compatibility of the magnetic disk pack. Further, attempts at high-band recording are now made in the field of magnetic recording by electronic still cameras and, in such a case, ensurance of better head touch is demanded.

On the other hand, there is an increasing demand for recording picture information on both surfaces of a magnetic disk housed within a magnetic disk pack. However, in view of various differences between the magnetic disk pack and a 3.5-inch or 5.25- inch floppy disk, the known technique of information recording on both surfaces of the floppy disk can not be applied to the magnetic disk pack. That is, as shown in Table 1, the thickness and diameter of the recording medium in the case of the magnetic disk pack are smaller than those of the 3.5-inch or 5.25-inch floppy disk, although the rotational speed of the magnetic disk is higher than that of the floppy disk. Further, a magnetic head makes sliding contact with a smaller area of each surface of the magnetic disk than that of the floppy disk as also shown in Table 1. This means that, because the flexibility of the magnetic disk used in the magnetic disk pack is far higher than that of the floppy disk, the magnetic heads cannot achieve stable sliding contact with the front and back surfaces of the magnetic disk when the magnetic heads are merely pressed onto those surfaces.

TABLE 1

| Particulars | Article | |
| --- | --- | --- |
| | Magnetic disk pack | Floppy disk |
| Thickness of recording medium | 40 ± 2 μm* | 80 μm |
| Diameter of recording medium | 47 mm* | 3.5 inches, 5.25 inches |
| Recording surface | One* | Two |
| Surface coated with magnetic material | Two | Two |
| Head sliding contact area | >300 μm² | Several mm² |

*According to the present standards.

In the case of the floppy disk adapted for information recording on its front and back surfaces, magnetic heads are always brought into contact with the both surfaces of the recording medium at the same positions by means of gimbal springs. However, when this method is applied to the magnetic disk pack, the magnetic disk tends to be subjected to wear and damage due to application of an excessively high pressure per unit area, because the area with which the magnetic head makes sliding contact is quite smaller than that of the floppy disk.

FIG. 1 of JP-A-62-1168 (1987) shows a magnetic disk recording/reproducing apparatus as shown in FIG. 15. Referring to FIG. 15, a pair of magnetic heads 222 and 223 are disposed opposite to each other on both sides of a rotatable magnetic disk 221 in slightly spaced apart relation, and a pad 224 or 225 is pressed onto the front or back surface of the magnetic disk 221 so as to successively bring the front or back surface of the magnetic disk 221 into contact with the magnetic head 222 or 223.

However, such an apparatus is defective in that a complex mechanism is required for moving the pads 224 and 225, and the magnetic disk 221 tends to be subjected to wear due to the continuous sliding contact of the pad 224 or 225 with the magnetic disk 221.

SUMMARY OF THE INVENTION

With a view to solving the problems encountered with the prior art magnetic disk pack and magnetic disk recording/reproducing apparatus, it is an object of the present invention to provide a magnetic disk pack which is provided with means for ensuring satisfactory head touch by co-operating with a regulation member or control members when such a member or members are used.

Another object of the present invention is to provide a magnetic disk pack in which the regulation member or control members are unnecessary and which is provided with means for singly ensuring satisfactory head touch.

Still another object of the present invention is to provide a magnetic disk recording/reproducing apparatus which can record and reproduce picture information on and from both surfaces of a magnetic disk offered in the form of a magnetic disk pack and which ensures satisfactory head touch.

In accordance with one aspect of the present invention which attains the first and second objects described above, there is provided a magnetic disk pack comprising a flexible magnetic disk and a protective casing rotatably accommodating the magnetic disk thereinside, the protective casing having a pair of aligned windows formed at corresponding positions respectively so that a magnetic head can be inserted into one of the windows to be brought into sliding contact with the rotating magnetic disk thereby recording and reproducing picture information on and from the magnetic disk, wherein a lug having an inclined surface for urging the rotating magnetic disk toward and onto the magnetic head by utilization of a positive pressure is formed along an inner part of the marginal edge of the other window into which the magnetic head is not inserted.

The lug may be formed along the inner part of the marginal edge of the window on at least one of the upstream and downstream sides of the magnetic head.

In lieu of or in addition to the lug described above, a second lug having an inclined surface for attracting the magnetic disk toward and onto the magnetic head by utilization of a negative pressure may be formed along an inner part of the marginal edge of the window into which the magnetic head is inserted.

This second lug may be formed along the inner part of the marginal edge of the window on at least one side of the magnetic head.

The lug described above has an inclined surface which makes an angle with a so-called free rotation plane in which the magnetic disk freely rotates without impartation of any external force. Therefore, in the case of the lug having the inclined surface progressively approaching the magnetic disk in the direction from its upstream end toward its downstream end relative to the direction of rotation of the magnetic disk, a positive pressure is induced between the magnetic disk and the inclined surface of the lug. On the other hand, in the case of the lug having the inclined surface progressively spaced apart from the magnetic disk in the direction toward its downstream end relative to the rotating direction of the magnetic disk, a negative pressure is induced between the magnetic disk and the inclined surface of the lug. Because of induction of the positive and negative pressures in the manner described above, the flexible magnetic disk is urged and attracted toward and onto the magnetic head to ensure satisfactory sliding contact between the magnetic disk and the magnetic head.

In accordance with another aspect of the present invention which attains the third object described above, there is provided a magnetic disk recording/reproducing apparatus comprising a reversible spindle motor for rotating a flexible magnetic disk in one direction or the other, a first and a second magnetic head disposed opposite to each other on both sides, respectively, of the magnetic disk in slightly spaced apart relation, and control members each having an inclined surface and disposed on circumferentially opposite sides, respectively, of the first magnetic head, the control members acting to induce a negative pressure during rotation of the magnetic disk in one direction thereby attracting the magnetic disk toward and onto the first magnetic head and acting to induce a positive pressure during rotation of the magnetic disk in the other direction thereby urging the magnetic disk toward and onto the second magnetic head.

In addition to the control members disposed on the circumferentially opposite sides, respectively, of the first magnetic head, control members having an inclined surface may be disposed on circumferentially opposite sides, respectively, of the second magnetic head so as to induce a positive pressure during rotation of the magnetic disk in one direction thereby urging the magnetic disk toward and onto the first magnetic head and to induce a negative pressure during rotation of the magnetic disk in the other direction thereby attracting the magnetic disk toward and onto the second magnetic head.

The inclined surface makes an angle with the free rotation plane of the magnetic disk as described above, and positive and negative pressures are induced between the rotating magnetic disk and the inclined surfaces of the control members as described above. When the direction of rotation of the magnetic disk is reversed by the reversible spindle motor, the control members having induced the positive pressure act now to induce a negative pressure, while the control members having induced the negative pressure act now to induce a positive pressure. As a result, the magnetic disk is now deflected in the opposite direction to make sliding contact with the other magnetic head. Thus, magnetic recording and reproduction of picture information on and from the both surfaces of the magnetic disk can be effected.

BRIEF DESCRIPTION OF THE DRAWINGS

FIG. 1 is a sectional view of a first embodiment of the magnetic disk pack according to the present invention.

FIG. 3 is a sectional view of a second embodiment of the magnetic disk pack according to the present invention.

DESCRIPTION OF THE PREFERRED EMBODIMENTS

Preferred embodiments of the magnetic disk pack according to the present invention will now be described in detail with reference to FIGS. 1 to 5.

Figure 12:
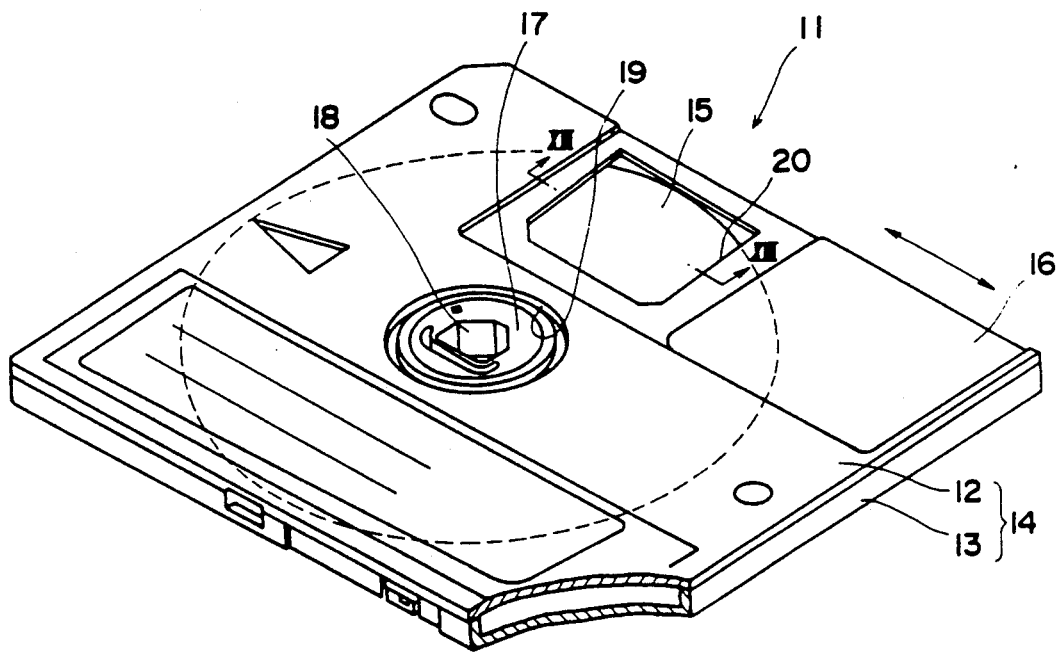
FIG. 12 is partly cut-away perspective view of the magnetic disk pack.
Figure 13:
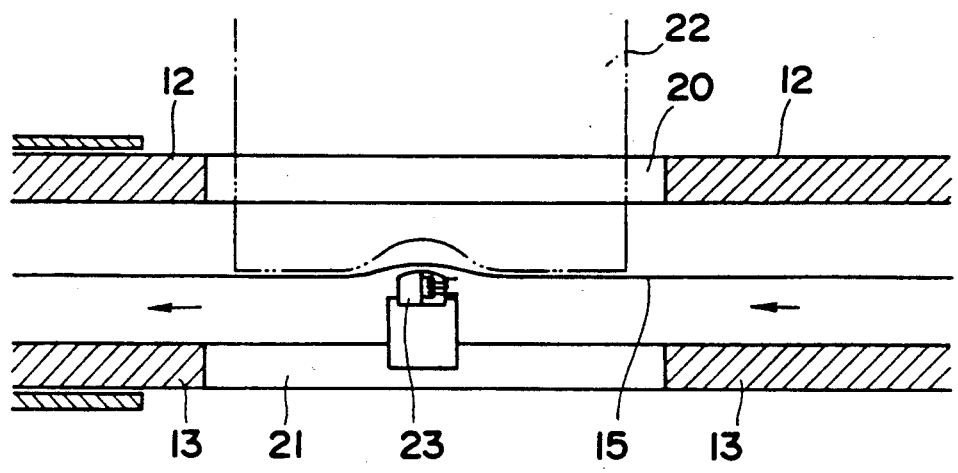
FIG. 13 is a sectional view taken along the line XIII-—XIII in FIG. 12.
Figure 14A:
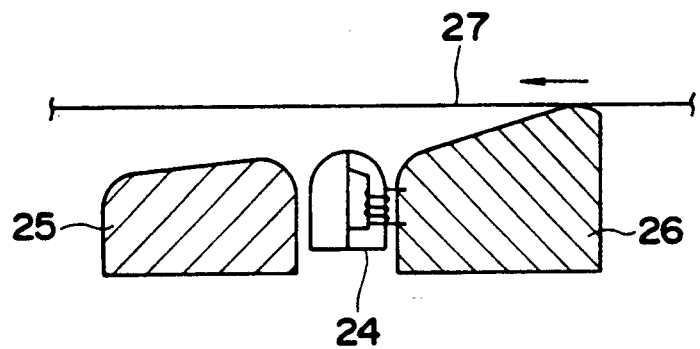
FIGS. 14A and 14B show control members used hitherto for attracting a magnetic disk toward and onto a magnetic head by utilization of a negative pressure.
Figure 14B:
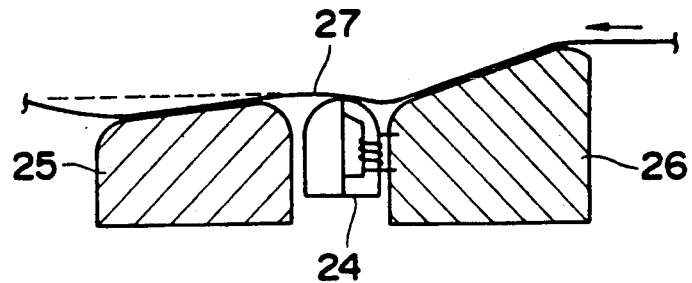
Figure 15:
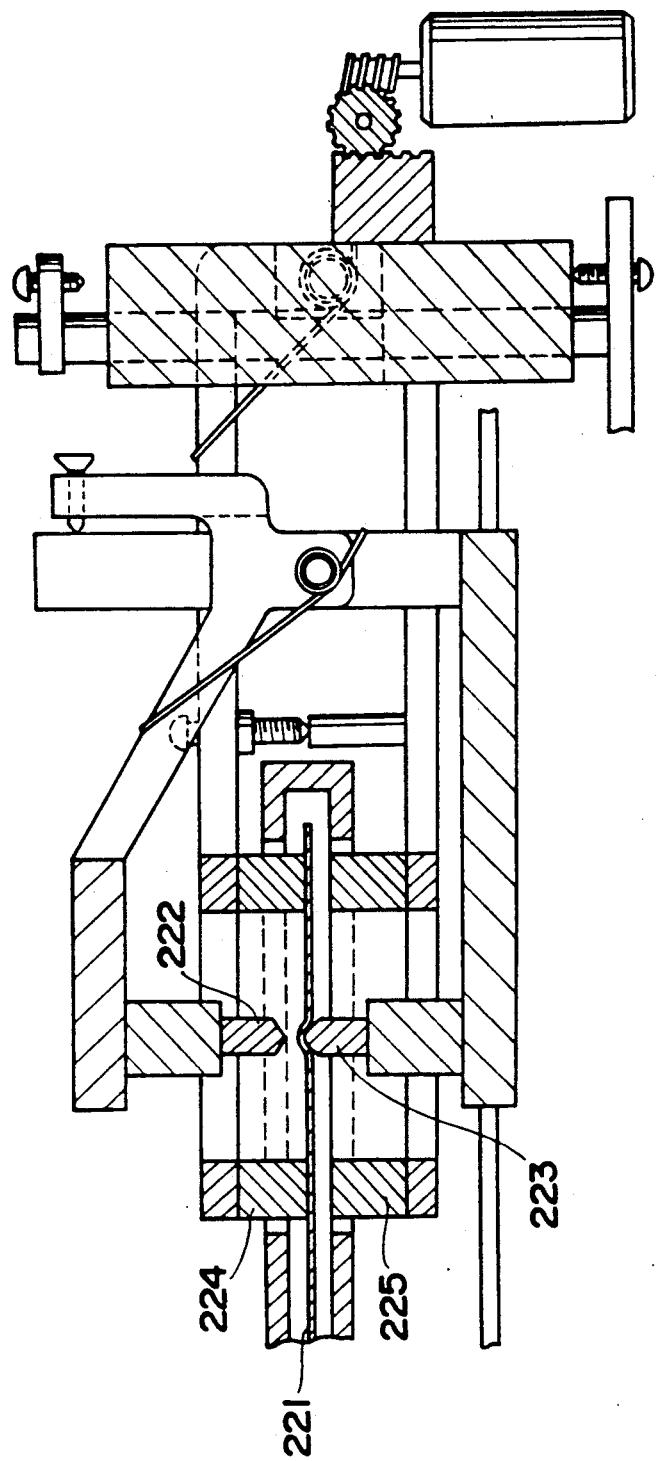
FIG. 15 is a sectional view of a prior art magnetic disk recording/reproducing apparatus.

FIG. 1 shows a first embodiment of the magnetic disk pack according to the present invention. In FIG. 1, like reference numerals are used to designate like parts appearing in FIGS. 12 and 13. In the magnetic disk pack shown in FIG. 1, a positive pressure is utilized to urge a magnetic disk 15 toward and onto a magnetic head 24. FIG. 1 corresponds to FIG. 13 which is a sectional view taken along line XIII—XIII in FIG. 12.

Referring to FIG. 1, lugs 12a and 12b each having an inclined surface are formed along spaced inner parts of the marginal edge of a window 20 formed in an upper case 12 and are located at an upstream side and a downstream side respectively relative to the magnetic head 24 inserted into a window 21 of a lower case 13. The windows 20 and 21 are aligned. In each of these lugs 12a and 12b, the inclined surface makes an angle with a free rotation plane N in which the magnetic disk 15 freely rotates without impartation of any external force, More precisely, the inclined surface of each of the lugs 12a and 12b progressively approaches the free rotation plane N in the direction from the upstream end toward its downstream end relative to the direction of rotation of the magnetic disk 15. The inclination angles $\theta 1$ and $\theta 2$ of the inclined surfaces of the respective lugs 12a and 12b are not especially limited. however, these inclination angles $\theta 1$ and $\theta 2$ lie preferably within the range of, for example, 0.5° to 5°. Also, the widths W1 and W2 of the respective lugs 12a and 12b lie preferably within the range of, for example, 2 mm to 4 mm. The lugs 12a and 12b act to induce a positive pressure which is exerted on the magnetic disk 15 under rotation, but the range of inducing the positive pressure is limited. Therefore, the downstream ends of these lugs 12a and 12b are preferably as close to the magnetic disk 15 as possible, and a gap of several-tens of microns or less is commonly employed. Although the downstream end of the lugs 12a and 12b may contact the magnetic disk 15, impartation of more force which strongly presses the lugs 12a and 12b against the magnetic disk 15 is undesirable in that the magnetic disk 15 will be subjected to plastic deformation.

The window 20 formed in the upper case 12 is sized to permit insertion of a regulation member and has a relatively large size. Thus, the positive pressure induced by the lugs 12a and 12b may not be sufficiently exerted on the magnetic disk 15. Therefore, in the first embodiment of the magnetic pack, tapered control members 25 and 26 are disposed on the downstream and upstream sides respectively of the magnetic head 24. These control members 25 and 26 are inserted from the window 21 of the lower case 13 together with the magnetic head 24. Therefore, the positive pressure induced by the lugs 12a and 12b co-operates with a negative pressure induced by the control members 25 and 26, thereby urging and attracting the magnetic disk 15 toward and onto the magnetic head 24.

Figure 2A:
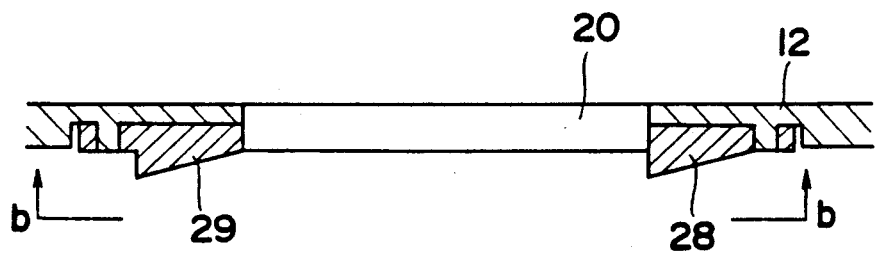
FIG. 2A is a modification of the first embodiment shown in FIG. 1.
Figure 2B:
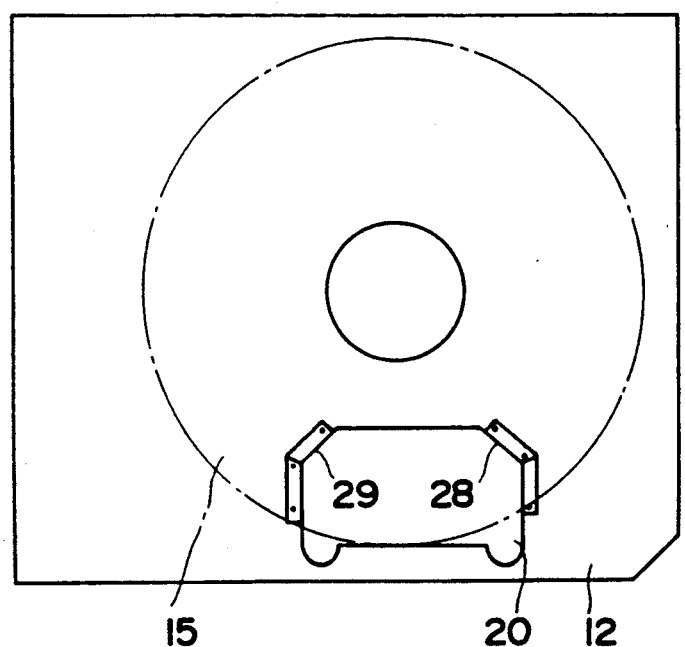
( FIG. 2B is a bottom plan view taken along the line b—b in FIG. 2A.
Figure 2C:
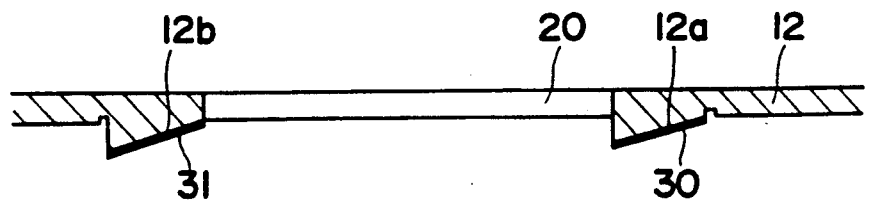
FIG. 2c is a sectional view of another modification of the first embodiment shown in FIG. 1.

In the first embodiment of the magnetic disk pack, the lugs 12a and 12b are formed integrally with the upper case 12. However, they may be separately provided. For example, tapered members 28 and 29 of a wear-resistive material having a low coefficient of friction may be fixed to spaced inner parts of the marginal edge of the window 20 of the upper case 12, as shown in FIGS. 2A and 2B. In another modification of the magnetic disk pack, coatings 30 and 31 of a wear-resistive material having a low coefficient of friction are provided on the surfaces of the tapered lugs 12a and 12b, as shown in FIG. 2C. In the first embodiment of the magnetic disk pack and its modifications described above, the tapered lugs or tapered members are disposed on both the upstream and downstream sides of the magnetic head 24. However, only one lug may be disposed on the upstream or downstream side of the magnetic head 24.

A second embodiment of the magnetic disk pack according to the present invention will be described with reference to FIG. 3. This second embodiment is also a modification of the first embodiment. A negative pressure is utilized. Referring to FIG. 3, lugs 13a and 13b having inclined surfaces are formed along spaced inner parts of the marginal edge of the window 21 of the lower case 13 at locations upstream and downstream respectively relative to the magnetic head 24. The inclined surface of each of these tapered lugs 13a and 13b is such that it is progressively spaced apart in the direction from its upstream end toward its downstream end from the free rotation plane N of the magnetic disk 15. The inclination angles and widths of these tapered lugs 13a and 13b are generally similar to those of the tapered lugs 12a and 12b of the first embodiment. The control members 25 and 26 are inserted together with the magnetic head 24 in the window 21 of the lower case 13, so that a negative pressure induced by the tapered control members 25 and 26 co-operates with a negative pressure induced by the tapered lugs 13a and 13b thereby attracting the magnetic disk 15 toward and onto the magnetic head 24. In this second embodiment too, the tapered lugs 13a and 13b may be replaced by tapered members of a wear-resistive material having a low coefficient of friction as shown in FIGS. 2A and 2b, or a coating of such a material may be provided as shown in FIG. 2C. Further, although the tapered lugs 13a and 13b are disposed on both the upstream and downstream sides respectively of the magnetic head 24 in the second embodiment, only one of them may be provided when the other is unnecessary.

A third embodiment of the magnetic disk pack according to the present invention will now be described with reference to FIGS. 4 and 5. This third embodiment is adapted for information recording on both surfaces of a recording medium.

Figure 4:
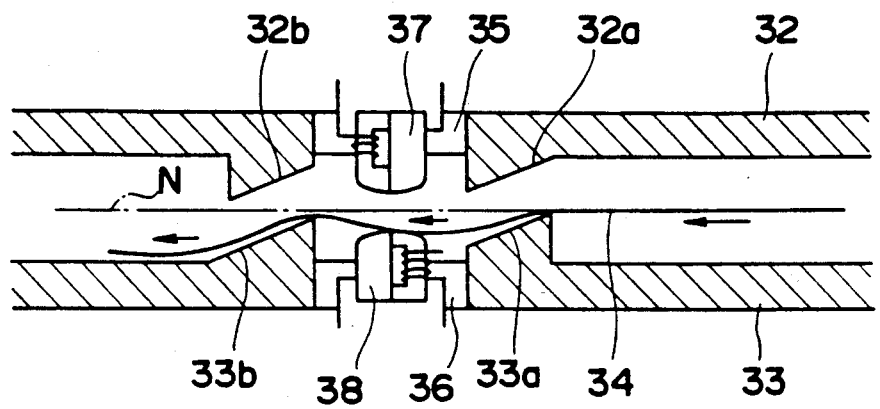
FIGS. 4 and 5 are sectional views of a third embodiment of the magnetic disk pack according to the present invention.
Figure 5:
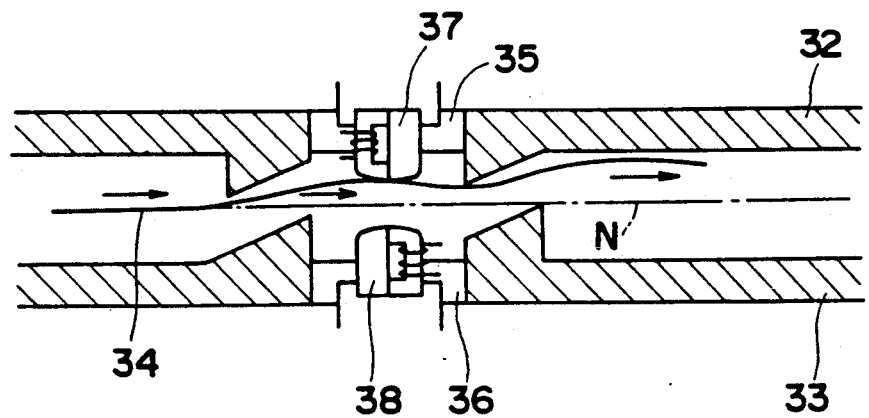

Referring to FIGS. 4 and 5, a flexible magnetic disk 34 is housed between an upper case 32 and a lower case 33, and aligned windows 35 and 36 are formed at corresponding positions of the upper and lower cases 32 and 33 respectively. A first magnetic head 37 and a second magnetic head 38 are inserted in the windows 35 and 36 respectively to oppose each other on both sides of the magnetic disk 34. Lugs 32a and 32b each having an inclined surface are formed along spaced inner parts of the marginal edge of the window 35 to be disposed on right-hand and left-hand sides respectively of the magnetic head 37 inserted in the window 35 in FIG. 4. The inclined surface of each of the tapered lugs 32a and 32b is such that it progressively approaches the free rotation plane N of the magnetic disk 35 from its right-hand end toward the left until the gap becomes narrowest at the left-hand end in FIG. 4. Also, lugs 33a and 33b each having an inclined surface are formed along spaced inner parts of the marginal edge of the window 36 to be disposed on the right-hand and left-hand sides respectively of the magnetic head 38 inserted in the window 36 in FIGS. 4. The inclined surface of each of the tapered lugs 33a and 33b is such that it is progressively spaced apart from the free rotation plane N of the magnetic disk 34 from its right-hand end toward the left until the gap becomes widest at the left-hand end in FIG. 4.

Therefore, when the magnetic disk 34 is rotated leftward from the right as shown by the arrow in FIG. 4, a positive pressure is induced between the tapered lugs 32a, 32b and the magnetic disk 34, while, at the same time, a negative pressure is induced between the tapered lugs 33a, 33b and the magnetic disk 34. As a result, the magnetic disk 34 is urged by the positive pressure and attracted by the negative pressure to make stable sliding contact with the second magnetic head 38. On the other hand, when the magnetic disk 34 is rotated rightward from the left as shown by the arrow in FIG. 5, the negative pressure is now induced between the tapered lugs 32a, 32b and the magnetic disk 34, while, at the same time, the positive pressure is now induced between the tapered lugs 33a, 33b and the magnetic disk 34. As a result, the magnetic disk 34 is urged by the positive pressure and attracted by the negative pressure to make stable sliding contact with the first magnetic head 37.

In this third embodiment, it is necessary to rotate the magnetic disk 34 in both directions to record information on both surfaces of the magnetic disk 34. However, the apparatus for recording and reproducing information on and from the magnetic disk 34 is advantageous in that provision of the regulation member and/or the control members is unnecessary.

Although the third embodiment is adapted for recording information on both surfaces of the magnetic disk 34, one of the magnetic heads 37 and 38 may be eliminated for recording information on one surface only. It is apparent that, even in such a case, stable head touch can be ensured without the necessity for provision of the regulation member, etc.

The technical concept of the magnetic disk recording/reproducing apparatus according to the present invention will be described with reference to a diagrammatic view shown in FIG. 6.

Figure 6:
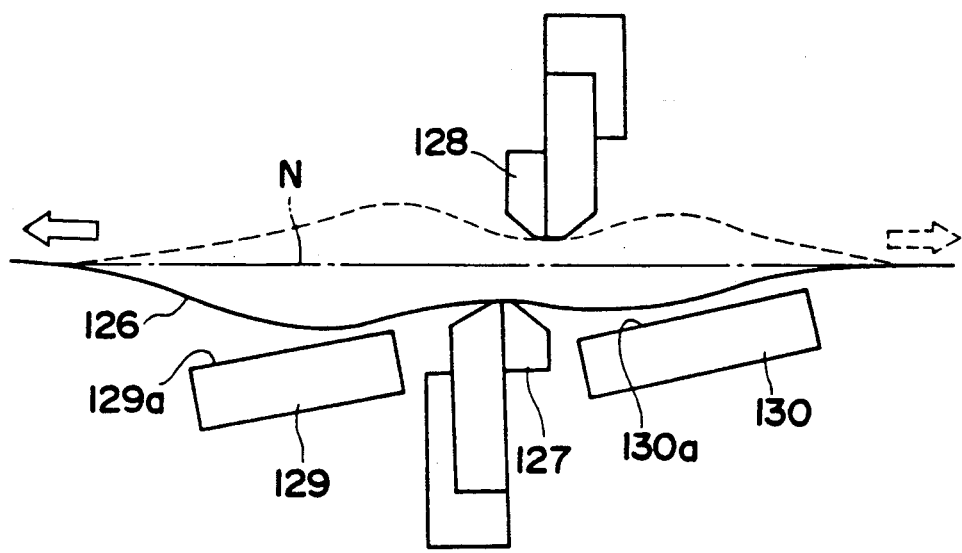
FIG. 6 is a diagrammatic view illustrating the concept of magnetic recording and reproduction according to the present invention.

Referring to FIG. 6, magnetic heads 127 and 128 are located opposite to each other on both sides respectively of a flexible magnetic disk 126 in slightly spaced apart relation, and control members 129 and 130 are disposed on circumferentially opposite sides respectively of the first magnetic head 127, that is, on opposite sides with respect to the circumferential direction of the magnetic disk 126. These control members 129 and 130 have respective inclined surfaces 129a and 130a facing the magnetic disk 126. the term "inclined surface" is used to designate such a surface which is not parallel to but makes an angle with a free rotation plane N in which the magnetic disk 126 freely rotates without impartation of any external farce. Each of the inclined surfaces 129a and 130a has such an inclination which progressively approaches the free rotation plane N from its left-hand end toward the right in FIG. 6 until the gap between them becomes narrowest at the right-hand end.

When now the magnetic head 127 located beneath the magnetic disk 126 in FIG. 6 is used for information recording and reproduction, the magnetic disk 126 is rotated in the direction shown by the solid arrow in FIG. 6. In this case, the inclined surfaces 129a and 130a of the respective control members 129 and 130 are progressively spaced apart from the magnetic disk 126 as the magnetic disk 126 is rotated in that direction. As a result, a positive pressure is induced between the magnetic disk 126 and the inclined surfaces 129a, 130a of the respective control members 129 and 130, and the magnetic disk 126 is urged toward the magnetic head 128 as shown by the broken curve in FIG. 6 until it makes sliding contact with the magnetic head 128.

Thus, in the magnetic disk recording/reproducing apparatus according to the present invention, the magnetic disk 126 can be brought into sliding contact with one of the magnetic heads 127 and 128 by rotating the magnetic disk 126 in one direction or the other, so that information can be recorded on and reproduced from both surfaces of the magnetic disk 126.

FIG. 7 to 11 show practical structures of preferred embodiments of the magnetic disk recording/reproducing apparatus according to the present invention. As will be apparent from the description given with reference to FIG. 6, control members are to be associated with at least one magnetic head in the magnetic disk recording/reproducing apparatus of the present invention. However, in the embodiments which will be described below, such control members are provided for each of the magnetic heads so as to ensure reliable head touch.

Figure 7:
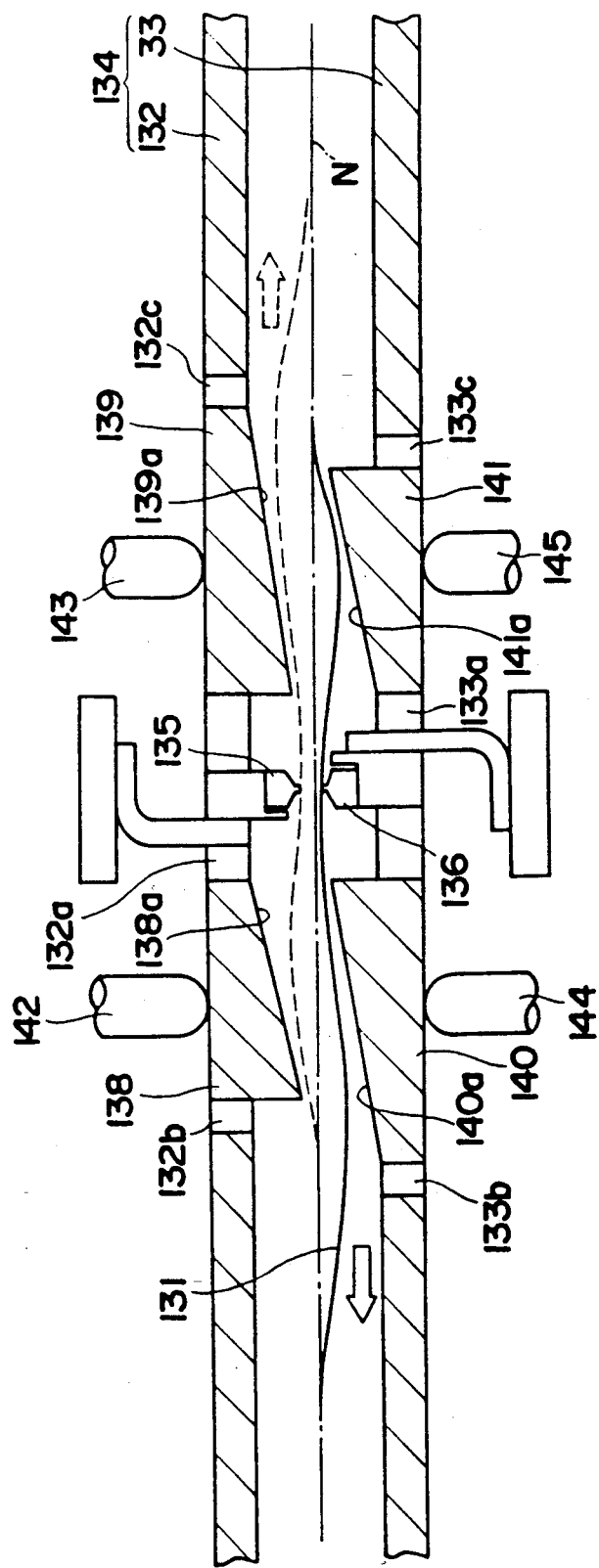
FIG. 7 is a sectional view of part of a first embodiment of the magnetic disk recording/reproducing apparatus according to the present invention.
Figure 8A:
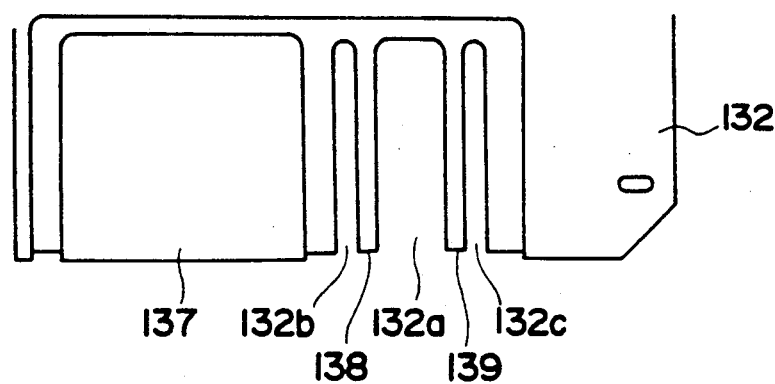
FIGS. 8A and 8B are plan views of part of the magnetic disk pack shown in FIG. 7.
Figure 8B:
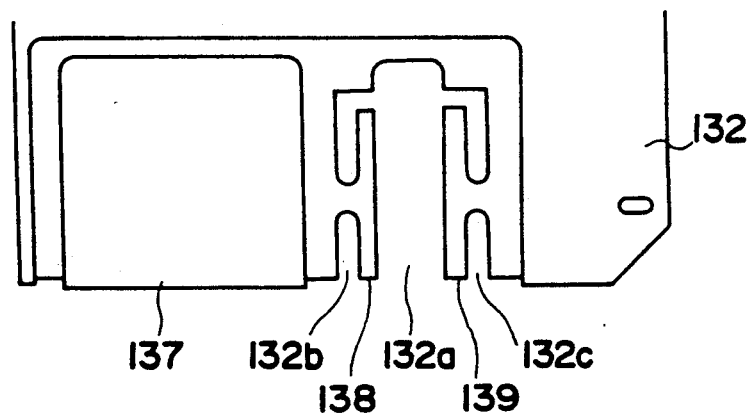
Figure 9:
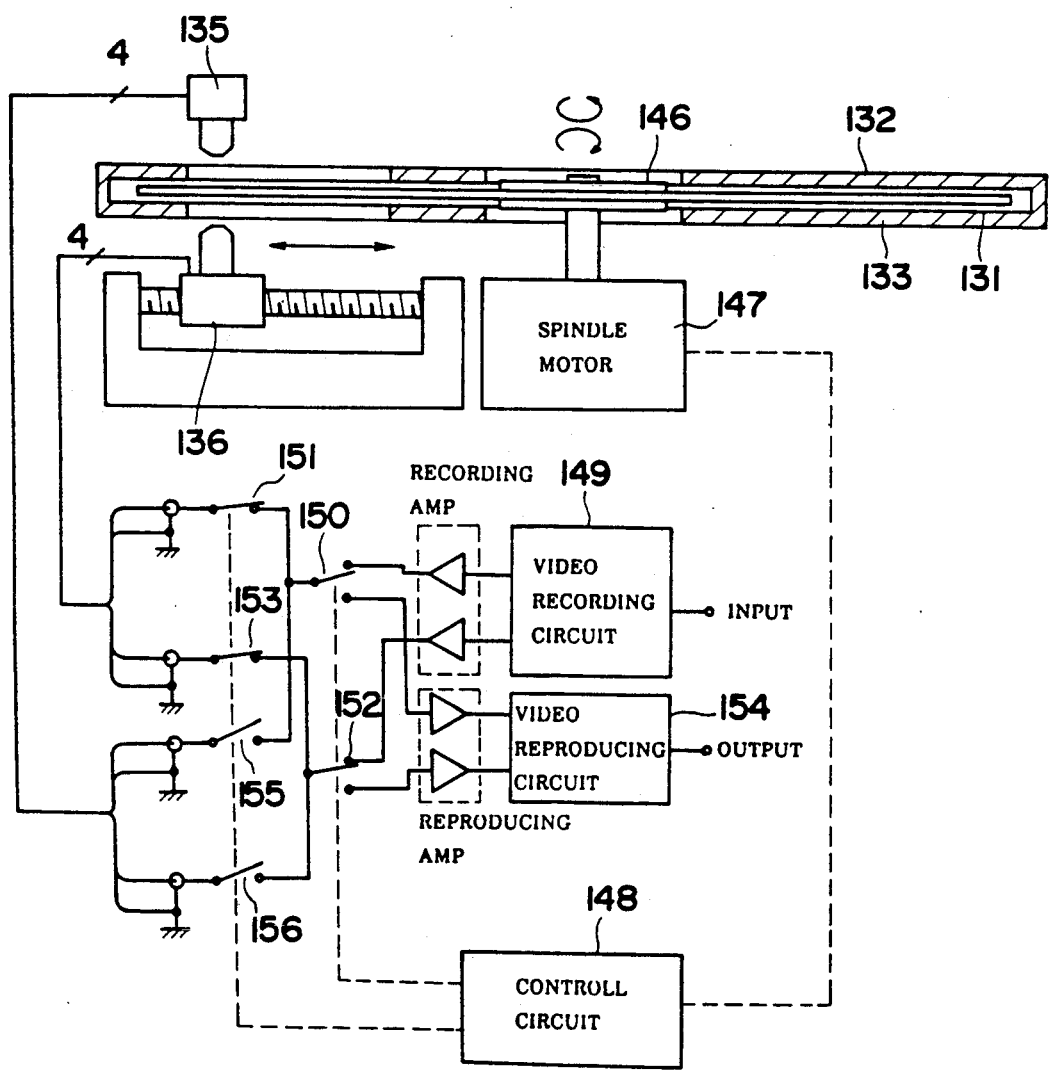
FIG. 9 is a block circuit diagram of a control device employed to effect video information recording and reproduction on and from both surfaces of the magnetic disk.

FIGS. 7 to 9 show the practical structure of a further embodiment of the magnetic disk recording/reproducing apparatus according to the present invention.

Referring to FIG. 7, a flexible magnetic disk 131 is rotatably housed within a protective casing 134 consisting of an upper case 132 and a lower case 133 in the form of a so-called magnetic disk pack. In the magnetic disk pack, the upper case 132 and the lower case 133 are formed with aligned windows 132a and 133a to permit insertion of magnetic heads 135 and 136 respectively, and a shutter 137 for opening and closing each of the windows 132a and 133a is slidably mounted as shown in FIG. 8A or 8B. The magnetic heads 135 and 136 inserted into the upper and lowers cases 132 and 133 from the window 132a and 133a are disposed opposite to each other on both sides of the magnetic disk 131 in slightly spaced apart relation. The upper case 132 is formed with slits 132b and 132c on both sides of the window 132a, and control members 138 and 139 having inclined surfaces 138a and 139a are resiliently supported between the slits 132b, 132c and the window 132a on circumferentially opposite sides of the magnetic head 135 (that is, along the circumferential direction of the magnetic disk 131), respectively. Similarly, the lower case 133 is formed with slits 133b and 133c on both sides of the window 133a, and control members 140 and 141 having inclined surfaces 140a and 141a are resiliently supported on circumferentially opposite sides of the magnetic head 136. The slits 132b and 132c may be shaped to support the control members 138 and 139 in a cantilever fashion as shown in FIG. 8A. Alternatively, the slits 132b and 132c may be shaped to support the center of the control members 138 and 139 in a T-like fashion as shown in FIG. 8B. The slits 133b and 133c are similarly shaped. The control members 138, 139 and the control members 140, 141 are molded integrally with the upper case 132 and the lower case 133 respectively.

The inclined surfaces 138a, 139a, 140a and 141a of the respective tapered control members 138, 139, 140 and 141 have inclinations as shown in FIG. 7. More precisely, the inclined surfaces 138a and 139a formed on the control members 138 and 139 located on either side of the magnetic head 135 are inclined toward their left-hand ends to progressively approach the free rotation plane N, while the inclined surfaces 140a and 141a formed on the control members 140 and 141 are inclined toward their left-hand ends to be progressively spaced apart from the free rotation plane N. The inclination angle of the inclined surfaces 139a and 141a of the respective control members 139 and 141 disposed on the upstream side may differ from that of the inclined surfaces 138a and 140a of the respective control members 138 and 140 disposed on the downstream side, or the inclination angle of the inclined surfaces 138a and 139a of the respective control members 138 and 139 disposed opposite to the respective control members 140 and 141 may differ from that of the inclined surfaces 140a and 141a. The same applies to the length of these inclined surfaces. For example, the inclination angles of the inclined surfaces are preferably smaller than or equal to 7°, and the lengths of the inclined surfaces are preferably from 1 mm to 7 mm.

When the control members 138, 139, 140 and 141 are mounted in the magnetic disk recording/reproducing apparatus embodying the present invention, they are urged toward the magnetic disk 131 by respective control pins 142, 143,144 and 145 as shown in FIG. 7. Under the above condition, the smallest distance between the control members 138, 139, 140, 141 and the free rotation plane N of the magnetic disk 131 is set at a value smaller than several-hundred $\mu$m. Such a distance is selected so that a positive pressure and a negative pressure are effectively induced between the magnetic disk 131 and the inclined surfaces of the control members 138, 139, 140 and 141 thereby attracting or urging one of the magnetic heads 135 and 136 toward or away from the magnetic disk 131 as shown by the solid curve or broken curve in FIG. 7. The free rotation plane N of the magnetic disk 131 designates the region in which the magnetic disk 131 freely rotates in the absence of the magnetic heads and control members. Therefore, this region has a thickness of about 100 $\mu$m owing to undulation or slight vibration of the magnetic disk 131.

When the magnetic disk pack is unloaded from the magnetic disk recording/reproducing apparatus embodying the present invention, and the control members 138 to 141 are released from the pressure imparted by the control pins 142 to 145, the control members 138 to 141 move away from the magnetic disk 131 by their resiliency. Thus, during transportation or storage of the magnetic disk pack, undesirable contact between the magnetic disk 131 and the control members 138 to 141 can be avoided.

The magnetic disk recording/reproducing apparatus recording and reproducing information on and from the magnetic disk 131 contained in such a magnetic disk pack loaded in the apparatus includes, in addition to the magnetic heads 135,136 and the control pins 142 to 145 described above, a reversible spindle motor 147 for rotating the magnetic disk 131 in either direction and a control circuit 148 for controlling the spindle motor 147. More precisely, a driver circuit is provided for driving the spindle motor 147 whose motor shaft or spindle is inserted into the center core 146 of the magnetic disk 131 rotatably housed within the protective casing to form the magnetic disk pack, and the control circuit 148 controls this driver circuit.

The control circuit 148 switches over the magnetic heads 135 and 136 depending on the direction of rotation of the spindle motor 147. For example, in the case of magnetic recording of video information by the magnetic head 136 on the lower recording surface of the magnetic disk 131 shown in FIG. 7, switches 150,151,152 and 153 are turned on to supply a video signal from a video recording circuit 149 to the magnetic head 136 via recording amplifiers as shown in FIG. 9, and the spindle motor 147 is controlled to rotate the magnetic disk 131 in the direction shown by the solid arrow in FIG. 7. With the rotation of the magnetic disk 131 in the above direction, a negative pressure is induced between the magnetic disk 131 and the control members 140 and 141 having the inclined surfaces 140a, 141a progressively spaced apart from the free rotation plane N of the magnetic disk 131 in the direction toward their downstream ends, with the result that the magnetic disk 131 is deflected and attracted downward in FIG. 7. At the same time, a positive pressure is induced between the magnetic disk 131 and the control members 138 and 139 having the inclined surfaces 138a and 139a progressively approaching the free rotation plane N of the magnetic disk 131 in the direction toward the downstream ends, with the result that the magnetic disk 131 is deflected and urged downward in FIG. 7. Thus, the magnetic disk 131 is deformed as shown by the solid curve in FIG. 7 and makes sliding contact with the magnetic head 136, and the video signal is magnetically recorded on the lower recording surface of the magnetic disk 131. On the other hand, when the switches 150 and 152 are changed over to their reproducing positions, the video signal reproduced by the magnetic head 136 from the lower recording surface of the magnetic disk 131 can be supplied to a video reproducing circuit 154 via reproducing amplifiers.

In the case of magnetic recording of video information by the magnetic head 135 on the upper recording surface of the magnetic disk 131 shown in FIG. 7, the switches 150 and 152 are changed over to their recording positions, and the switches 155 and 156 are turned on to supply a video signal from the video recording circuit 149 to the magnetic head 135 via the recording amplifiers, and the spindle motor 147 is controlled to rotate the magnetic disk 131 in the direction shown by the broken arrow in FIG. 7. With the rotation of the magnetic disk 131 in the above direction, a negative pressure is induced between the magnetic disk 131 and the control members 138 and 139 having the inclined surfaces 138a and 139a progressively spaced apart from the free rotation plane N of the magnetic disk 131 in the direction of toward their downstream ends, with the result that the magnetic disk 131 is deflected and attracted upward in FIG. 7. At the same time, a positive pressure is induced between the magnetic disk 131 and the control members 140 and 141 having the inclined surfaces 140a and 141a progressively approaching the free rotation plane N of the magnetic disk 131 in the direction toward their downstream ends, with the result that the magnetic disk 131 is deflected and urged upward in FIG. 7. Thus, the magnetic disk 131 is deformed as shown by the broken curve in FIG. 7 and makes sliding contact with the magnetic head 135, and the video signal is magnetically recorded on the upper recording surface of the magnetic disk 131. On the other hand, when the switches 150 and 152 are changed over to their reproducing positions, the video signal reproduced by the magnetic head 135 from the upper recording surfaces of the magnetic disk 131 can be supplied to the video reproducing circuit 154 via the reproducing amplifiers.

In the manner described above, video information can be recorded and reproduced on and from both surfaces of the magnetic disk 131 by selectively rotating the magnetic disk 131 in one or the other direction and bringing the magnetic disk 131 into sliding contact with one of the magnetic heads 135 and 136. Therefore, the magnetic heads 135 and 136 are substantially protect against wear and damage as compared to the case where both magnetic heads 135 and 136 make continuous contact with the magnetic disk 131. This is very important for a magnetic disk pack using a magnetic disk in which the thickness of the recording medium is smaller and the rotational speed is higher than those of 3.5-inch and 5.25-inch floppy disks and which makes sliding contact with a magnetic head having a small contact area. Further, because a negative pressure and a positive pressure only are utilized to bring the magnetic disk into sliding contact with the magnetic head, and the magnetic disk does not make contact with parts other than the magnetic heads, undesirable wear of the magnetic disk can also be prevented.

Figure 10:
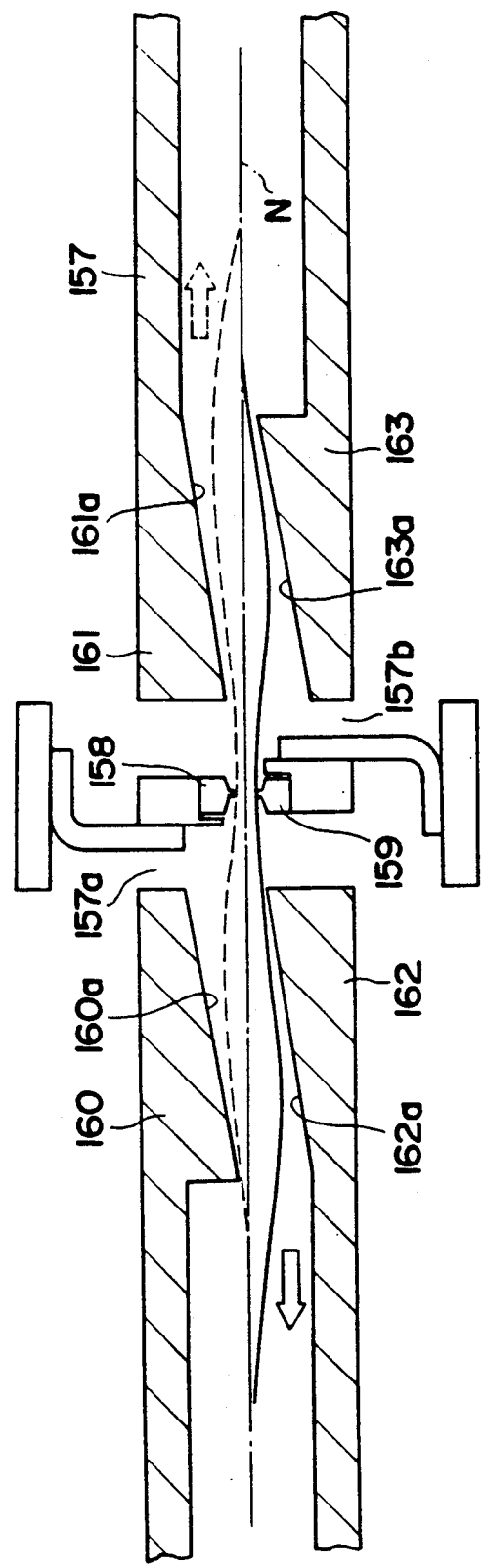
FIGS. 10 and 11 are sectional views of part of other embodiments respectively of the magnetic disk recording/reproducing apparatus according to the present invention.

The present invention is no way limited to the illustrated embodiment in which the control members 138 to 141 are resiliently supported. For example, FIG. 10 shows another embodiment of the magnetic disk recording/reproducing apparatus of the present invention. Referring to FIG. 10, a protective casing 157 of a magnetic disk pack, in which a magnetic disk is rotatably housed, is formed with windows 157a and 157b permitting insertion of respective magnetic heads 158 and 159. Respective magnetic heads 158 and 159, and control members 160, 161 and 162, 163 are integrally molded with the protective casing 157 along the openings of the windows 157a and 157b on circumferentially opposite sides of the magnetic heads 158 and 159 respectively. The control members 160, 161, 162 and 163 are formed with inclined surfaces 160a, 161a, 162a and 163a respectively. The relation between the free rotation plane N of the magnetic disk and these inclined surfaces 160a to 163a is similar to that described already with reference to FIG. 7. Therefore, when the magnetic disk is rotated in one direction as shown by the solid arrow in FIG. 10, a positive pressure is induced between the magnetic disk and the control members 160 and 161 having the respective inclined surfaces 160a and 161a, while, at the same time a negative pressure is induced between the magnetic disk and the control members 162 and 163 having the respective inclined surfaces 162a and 163a, as in the case of the aforementioned embodiment. As a result, the magnetic disk is deflected and deformed as shown by the solid curve in FIG. 10 to make sliding contact with the magnetic head 159. Conversely, when the magnetic disk is rotated in the other direction shown by the broken arrow in FIG. 10, the magnetic disk is deformed as shown by the broken curve in FIG. 10 and now makes sliding contact with the magnetic head 158.

Figure 11:
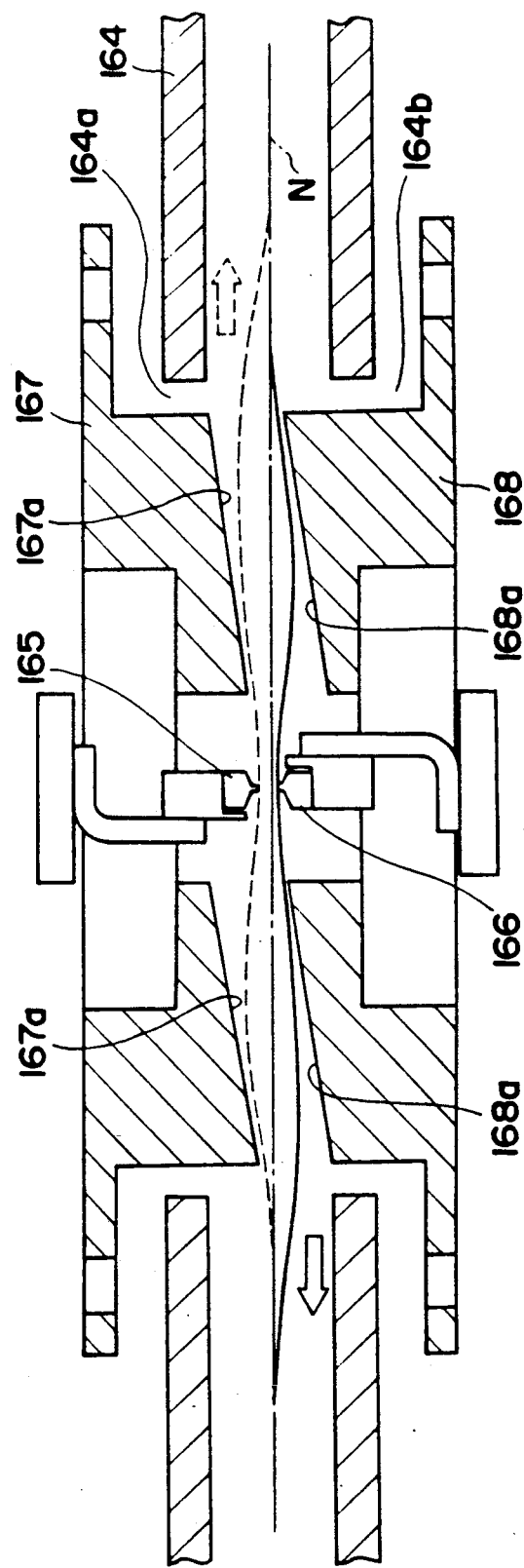

Instead of providing the control members in the protective casing of the magnetic disk pack, the control members may be mounted in the magnetic disk recording/reproducing apparatus in which the magnetic disk pack is loaded. Such an embodiment of the magnetic disk recording/reproducing apparatus of the present invention is shown in FIG. 11. Referring to FIG. 11, a protective casing 164 of a magnetic disk pack, in which a magnetic disk is rotatably housed, is formed with windows 164a and 164b permitting insertion of magnetic head 165, 166 and control members 167, 168 respectively. Control members 167 and 168 having respective inclined surfaces 167a and 168a are inserted together with the magnetic heads 165 and 166 into the protective casing 164 through the windows 164a and 164b respectively, so that the aforementioned relation can be established between the free rotation plane N of the magnetic disk and the inclined surfaces 167a and 168a of the respective control members 167 and 168. The arrangement shown in FIG. 11 can exhibit the same functional effect as that of the aforementioned embodiments.

It will be understood from the foregoing detailed description of preferred embodiments of the magnetic disk pack of the present invention that at least one lug having an inclined surface is formed along an inner part of the marginal edge of one of the windows of a protective casing of the magnetic disk pack so as to induce a positive pressure or a negative pressure between a rotating magnetic disk and a lug having an inclined surface. As a result, the magnetic disk is urged or attracted toward a magnetic head to ensure satisfactory head touch. Therefore, the use of a prior art regulation member, control members, etc. is not always required, so that the structure of a magnetic disk recording/reproducing apparatus can be correspondingly simplified, and yet the compatibility of the magnetic disk pack can be improved.

It will also be understood from the foregoing detailed description of preferred embodiments of the magnetic disk recording/reproducing apparatus of the present invention that, even when magnetic heads having a small contact area are used for information recording and reproduction on and from a magnetic disk having a recording medium of a relatively small thickness, having a small diameter and rotated at a high speed, a positive pressure and a negative pressure induced due to rotation of the magnetic disk can be utilized to bring the magnetic disk into sliding contact with one of the magnetic heads depending on the direction of rotation of the magnetic disk. Therefore, video information can be satisfactorily recorded and reproduced on and from both surfaces of the magnetic disk by merely rotating the magnetic disk in either direction.

We claim:

1. A magnetic disk pack, comprising:
   a flexible magnetic disk and a protective casing rotatably accommodating said magnetic disk thereinside, said protective casing having a pair of aligned windows formed in at least upper and lower surfaces of said casing, at corresponding positions at a side of said casing, so that a magnetic head can be inserted into one of said windows to be brought into sliding contact with said magnetic disk while said disk is rotating, in a specified direction, thereby recording and reproducing information on and from said magnetic disk, wherein at least one first lug having a substantially flat inclined surface positioned so as to urge said rotating magnetic disk toward and onto said magnetic head by utilization of a positive pressure is formed along and integral with an inner part of a marginal edge of the window opposite that into which said magnetic head is inserted, said inclined surface lying in a plane which intersects a free plane of rotation of said disk at an acute angle.

2. A magnetic disk pack according to claim 1, wherein said lug is formed at least one of upstream and downstream sides of said magnetic head with respect to direction of rotation of said disk.

3. A magnetic disk pack according to claim 1 or 2, wherein at least one second lug having an inclined surface for attracting said magnetic disk toward and onto said magnetic head by utilization of a negative pressure is formed along and integral with an inner part of a marginal edge of said one window into which said magnetic head is inserted.

4. A magnetic disk pack according to claim 3, wherein said second lug is located at at least one of said an upstream and downstream sides of said magnetic head with respect to the direction of rotation of said disk.

5. A magnetic disk pack according to claim 3, wherein each of said lugs comprises a wear-resistive separate member having a low coefficient of friction fixedly mounted at the inner part of the marginal edge of respective one of said windows.

6. A magnetic disk pack according to claim 3, wherein each of said lugs includes a coating of a wear-resistive material having a low coefficient of friction.

7. A magnetic disk pack, comprising:
   a flexible magnetic disk and a protective casing rotatably accommodating said magnetic disk thereinside, said protective casing having a pair of aligned windows formed in at least upper and lower surfaces thereof, at a side thereof, so that a magnetic head can be inserted into one of said windows to be brought into sliding contact with said magnetic disk while said disk is rotating, thereby recording and reproducing information on and from said magnetic disk, wherein at least one first lug having a substantially flat inclined surface positioned so as to urge said rotating magnetic disk toward and onto said magnetic head by utilization of a negative pressure is formed along and integral with an inner part of a marginal edge of the window opposite that into which said magnetic head is inserted, said inclined surface lying in a plane which intersects a free plane of rotation of said disk at an acute angle.

8. A magnetic disk pack, comprising:
   a flexible magnetic disk;
   a protective casing rotatably accommodating said magnetic disk thereinside;
   a pair of aligned windows formed in upper and lower surfaces of said protective casing, said windows being respectively adapted to receive a magnetic head thereinto in a manner such that said magnetic head may contact said magnetic disk while said disk is rotating; and
   lug means integral with said protective casing and located at at least one marginal edge of at least one of said windows, and having a substantially flat surface which is inclined in a manner so as to assist the contact of said magnetic disk with a magnetic head when said disk is rotating, said surface lying in a plane which intersects a free plane of rotation of said disk at an acute angle.

* * * * *